(12) United States Patent
Satori et al.

(10) Patent No.: US 6,170,810 B1
(45) Date of Patent: Jan. 9, 2001

(54) LIQUID SEALED TYPE BUSHING

(75) Inventors: Kazutoshi Satori; Toru Sakamoto, both of Saitama (JP)

(73) Assignee: Yamashita Rubber Kabushiki Kaisha, Saitama (JP)

( * ) Notice: Under 35 U.S.C. 154(b), the term of this patent shall be extended for 0 days.

(21) Appl. No.: 09/132,329

(22) Filed: Aug. 11, 1998

(51) Int. Cl.[7] .................................................. F16F 13/00
(52) U.S. Cl. ...................................... 267/140.12; 267/219
(58) Field of Search ....................... 267/140.11, 140.12, 267/219, 140.13, 141.1, 141.2, 293, 141.3, 141; 248/562, 637, 638, 640

(56) References Cited

U.S. PATENT DOCUMENTS

| | | | |
|---|---|---|---|
| 4,749,173 | 6/1988 | Kanda | 267/140.1 |
| 4,871,151 | * 10/1989 | Kanda | 267/140.1 |
| 5,156,379 | 10/1992 | Tabata | 267/140.12 |
| 5,221,077 | * 6/1993 | Noguchi | 267/140.12 |
| 5,261,649 | * 11/1993 | Kato et al. | 267/140.12 |
| 5,375,821 | 12/1994 | Toshimitsu et al. | 267/140.12 |
| 5,423,511 | * 6/1995 | Tekeguchi | 248/638 |

* cited by examiner

Primary Examiner—Matthew C. Graham
Assistant Examiner—Mariano Sy
(74) Attorney, Agent, or Firm—Birch, Stewart, Kolasch & Birch, LLP

(57) ABSTRACT

A liquid sealed type bushing including an outer cylinder, an inner cylinder and an elastic member. Recesses are formed on a middle portion of the elastic member. The elastic member between the recesses is adapted to be a partition member and a thin wall portion is formed by providing a through hole in the partition member, and an outer peripheral portion of the partition member is made to contact but not combine with an inner face of the outer cylinder. Within the recess, a medium to high frequency device is supported by the inner cylinder. By overlapping a peak caused by a membrane resonance owing to the thin wall portion of the partition member, and a minimum value caused by a liquid column resonance of the medium to high frequency device, a low dynamic spring constant is attained in a medium to high frequency region.

17 Claims, 13 Drawing Sheets

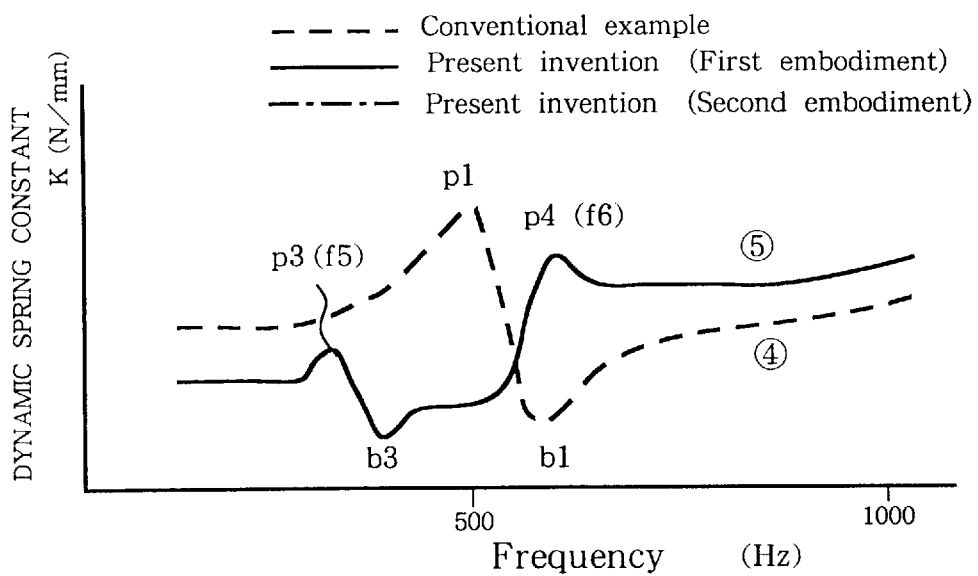
Fig.7-A
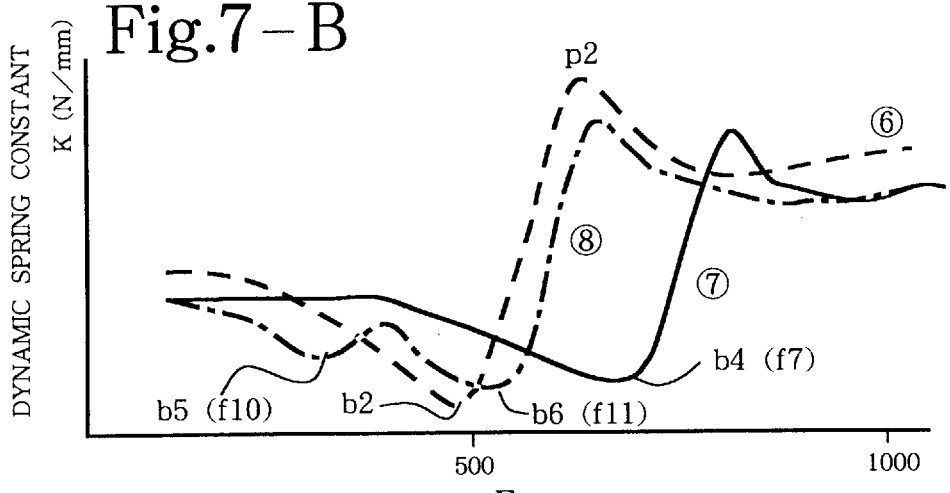
Fig.7-B
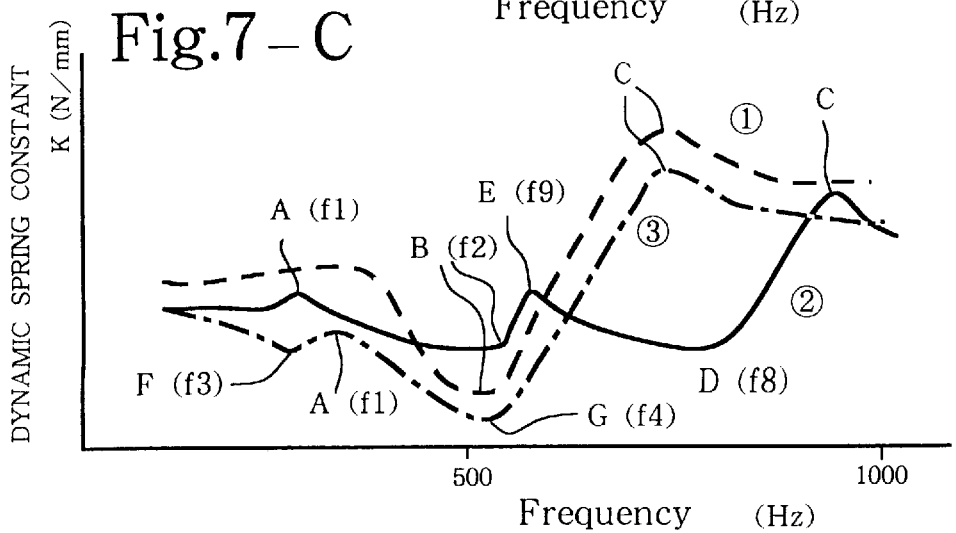
Fig.7-C

LIQUID SEALED TYPE BUSHING

BACKGROUND OF THE INVENTION

1. Field of the Invention

This invention relates to a liquid sealed type bushing used for an automobile engine mount and the like.

2. Description of the Prior Art

Liquid sealed type bushings are known, which comprise a generally cylindrical shaped outer cylinder and a core member arranged therein, an elastic member interposed between the outer cylinder and the core member, wherein a plurality of recesses are provided as liquid chambers on an outer peripheral side of a middle portion of the elastic member. A partition member divides two adjoining liquid chambers and is formed by a part of the elastic member and a medium to high frequency device, which includes an umbrella shaped member projecting into a liquid chamber and supported by the core member side.

According to this construction, because the partition member is rather thick (almost as thick as a minimum thickness of a circular wall portion formed on both ends of the core and the outer cylinder in an axial direction) and the outer peripheral portions thereof are directly or indirectly secured by baking to the inside of the outer cylinder, as shown in a characteristic curve ① of FIG. 6, the dynamic spring characteristic curve possesses a minimum value B and a large peak C generated by a reaction thereof.

A reason why the minimum value B and the peak C are generated is described referring to FIG. 7-A to FIG. 7-C. FIG. 7-A is a view showing a change of a dynamic spring constant by a membrane resonance vs. frequency. The membrane resonance is generated in that the partition member conducts as an elastic membrane against an inside liquid flow, because the partition member is thinner than the peripheral circular wall portion or other portion. The axis of abscissa shows frequency and the axis of ordinate shows a dynamic spring constant.

In these figures, a characteristic curve ④ shows a conventional plot. Here, since the partition member is rather thick and is secured on the outer cylinder side, the characteristic shows the relatively high dynamic spring constant, and possesses a peak p1 and a minimum value b1 changing abruptly around a border area of the medium frequency region and the high frequency region by membrane resonance.

FIG. 7-B shows a change of a liquid column resonance vs. frequency by the medium to high frequency device. The axis of abscissa shows frequency and the axis of the ordinate shows a dynamic spring constant. In the drawing, a characteristic curve ⑥ shows a conventional plot, the characteristic possesses a minimum value b2 owing to a liquid column resonance on a medium frequency region close to the high frequency region, and the frequency of the minimum value b2 is arranged to be almost the same as that of the peak p1.

When the characteristic curves ④ and ⑥ are overlapped, characteristic curve ① of FIG. 7-C results, namely, the peak p1 generated by the membrane resonance is cancelled by the minimum value b2 of the liquid column resonance, so the minimum value B is yielded.

Even if the minimum value of the dynamic spring constant is generated as above by using the medium to high frequency device, as shown in FIG. 7B, the peak p2, which results from the reaction of the resonance by the medium to high frequency device, remains as the peak C in the characteristic curve ①. Because of the extremely high dynamic spring constant in the higher frequency region, it cannot be realized to make the low dynamic spring characteristics in the wide frequency range across the medium to high frequency range.

On the other hand, in recent years, it is required for such a liquid sealed type bushing to actualize the low dynamic spring constant in the wide range of the medium frequency region (40 to 500 Hz), especially more than the 100 Hz region, and the high frequency region (500 to 1000 Hz).

SUMMARY OF THE INVENTION

In order to solve the problems described above, according to the first embodiment of the present invention, there is provided a liquid sealed type bushing comprising, an outer cylinder formed in a cylindrical shape, a core member arranged inside thereof, an elastic member interposed between the outer cylinder and the core member, a plurality of recesses formed as liquid chambers on an outer peripheral side of a middle portion of the elastic member, and a partition member made by a part of the elastic member provided between the chambers. The chambers are mutually communicated with an orifice passage and a medium to high frequency device projected into at least one liquid chamber and including an umbrella shaped member supported on the core member side. A thin wall portion is formed on a part of the partition member to yield a peak for a dynamic spring characteristic according to a vibration input in a medium to high frequency range by a membrane resonance, and an outer peripheral portion of the partition member is made to contact tightly but not to combine with the outer cylinder. The second embodiment includes a liquid sealed type bushing similar to the first embodiment wherein two peaks of a dynamic spring characteristic are made to occur in a medium frequency region and high frequency region owing to said membrane resonance and the peak of the high frequency region is made to be offset due to a minimum value generated by the medium to high frequency device.

The invention may include a liquid sealed type bushing of the first invention wherein said medium to high frequency device is constructed to yield minimum values of dynamic spring characteristic at two different resonance frequencies f3 and f4, and these frequencies and a frequency f1 at a peak of the dynamic spring characteristic by said membrane resonance have a following relation:

f3<f1<f4.

According to the first invention, when the partition member membrane resonates in the medium to high frequency region, because the partition member pocesses the thin wall portion, and the outer peripheral portion thereof are made not to combine but to be relatively movable with the outer cylinder, the peak of the dynamic spring characteristic is lowered. Moreover, in the medium to high frequency range, the minimum value is lowered owing to the medium to high frequency device. Therefore, when each frequency of the peak value and the minimum value of the dynamic spring characteristic is arranged to shift, the low dynamic spring constant can be realized in a wide frequency range.

The characteristic curve ⑤ is FIG. 7-A is a view showing the membrane resonance of the partition member in the present invention. As shown in the drawing, the thin wall portion is provided on said partition member and the outer peripheral portion is made not to be combined with the outer cylinder, so the lower dynamic spring constant, as compared with the conventional example of the characteristic curve ④, is achieved in the medium frequency range. The minimum value b3 generated by the membrane resonance occurs in a lower frequency of the medium frequency region than that of the peak p1 of the characteristic curve ④ and affects to the relatively wide frequency range and the peak value p3 occurred at somewhat lower frequency is also lowered.

However, the peak value p4 generated by the reaction owing to the minimum value b3 in the higher frequency is almost as large as the peak value p1, and the curve shows the higher dynamic spring constant than the characteristic curve ④ in a higher frequency than that of p4. Each frequency of the peak value p3 and p4 is assumed as f5 and f6.

The characteristic curve ⑦ of FIG. 7-B is a view showing the characteristics of the liquid column resonance caused by the medium to high frequency device. A position of the minimum value b4 in the curve ⑦ is shifted to higher frequency side from that of the characteristics curve ⑥ of the conventional example, and the frequency f7 for the b4 is set as a little higher than the frequency f6 for the peak p4 of the characteristic curve ⑤ (f6<f7).

When the characteristic curves ⑤ and ⑦ are superposed, a characteristic curve ② of FIG. 7-C is obtained. Because the minimum value b4 owing to the liquid column resonance is superposed on the peak value p4 generated owing to the membrane resonance, the minimum values B and D occur between the peak A and the peak C. Between the minimum values B and D, lower peak E is formed. When it is assumed that the frequencies of the minimum values B and D are f2 and f8, and the frequencies of the peak values A and E are f1 and f9, the size order of these frequencies is f1<f2<f9<f8, and frequencies f9 and f8 are positioned in the high frequency range. It is well known that when the membrane resonance and the liquid column resonance are superposed, the resonance point is shifted a little to the higher frequency side or the lower frequency side.

In the characteristic curve ②, as apparent from FIG. 7-C and FIG. 6, the minimum value B contributes to lowering the dynamic spring constant mainly in the medium frequency region. The minimum value D contributes to lowering the dynamic spring constant mainly in the high frequency region and as a whole. Lowering of the dynamic spring constant in the high frequency region is advantageously achieved.

When the characteristic curve ② is compared with the conventional characteristic curve ①, it is shown that the characteristic ② is a little higher only at the minimum value B portion, but this portion is a one coinciding with the minimum value B in the characteristic curve ①, and the dynamic spring constant therein is sufficiently low in practice. Hence, the low dynamic spring constant is actualized in a wide range spreading over the medium to high frequency range of 100 to 1000 Hz.

Therefore, when the two peaks A and E occur in the medium frequency range and the high frequency range on both side of the minimum value B in the vicinity of the boundary portion of the medium frequency region and high frequency region by the two peaks p3 and p4 occurring in the medium frequency region and high frequency region accompanying with the membrane resonance, if the minimum value D is set to appear in a higher frequency side than that of the peak E through offsetting the peak p4 in the high frequency region by the minimum value b4 generated owing to the medium to high frequency device, it is advantageously realized to lower the dynamic spring constant, especially in the high frequency region. This state corresponds a state carried by the second embodiment of the present invention. In this time, the frequency relations between the each values are f2<f9<f8.

According to the second embodiment as shown by the characteristic curve ⑧ in FIG. 7-B, through setting the two different resonance points in the medium to high frequency device, the characteristic curve can be constructed to yield the minimum values b5 and b6 of the dynamic spring characteristic in two different resonance frequencies f10 and f11. In this case, for the two peaks p3 and p4 in both sides of the minimum value b3 in the characteristic curve ⑤ of FIG. 7-A, the frequencies according to each values are set to be as f10<f5<f11<f6.

Resulting from this, when the characteristic curve ⑧ is superposed on the characteristic curve ⑤ of the membrane resonance, the two peaks p3 and p4 in the characteristic curve ⑤ of FIG. 7-A are offset by the minimum values b5 and b6, which makes the characteristic curve ③ of FIG. 7-C and the minimum values F and G occur in both sides of the peak A in the medium frequency region. In this case, when it is assumed as a frequency of the peak A is f1 and each frequencies according to the minimum value F and G are f3 and f4, frequency relations thereof are f3<f1<f4.

Therefore, when the dynamic spring constant is set as above a remarkably low dynamic spring constant is realized, especially in the medium frequency side. The lowering the dynamic spring constant can be realized in the wide range of the entire medium to high frequency region.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings, which are given by way of illustration only, and thus are not limitative of the present invention, and wherein:

FIGS. 7-A through 7-C show the formation of the dynamic spring characteristics;

DETAILED DESCRIPTION OF THE PREFERRED EMBODIMENT

Figure 1:
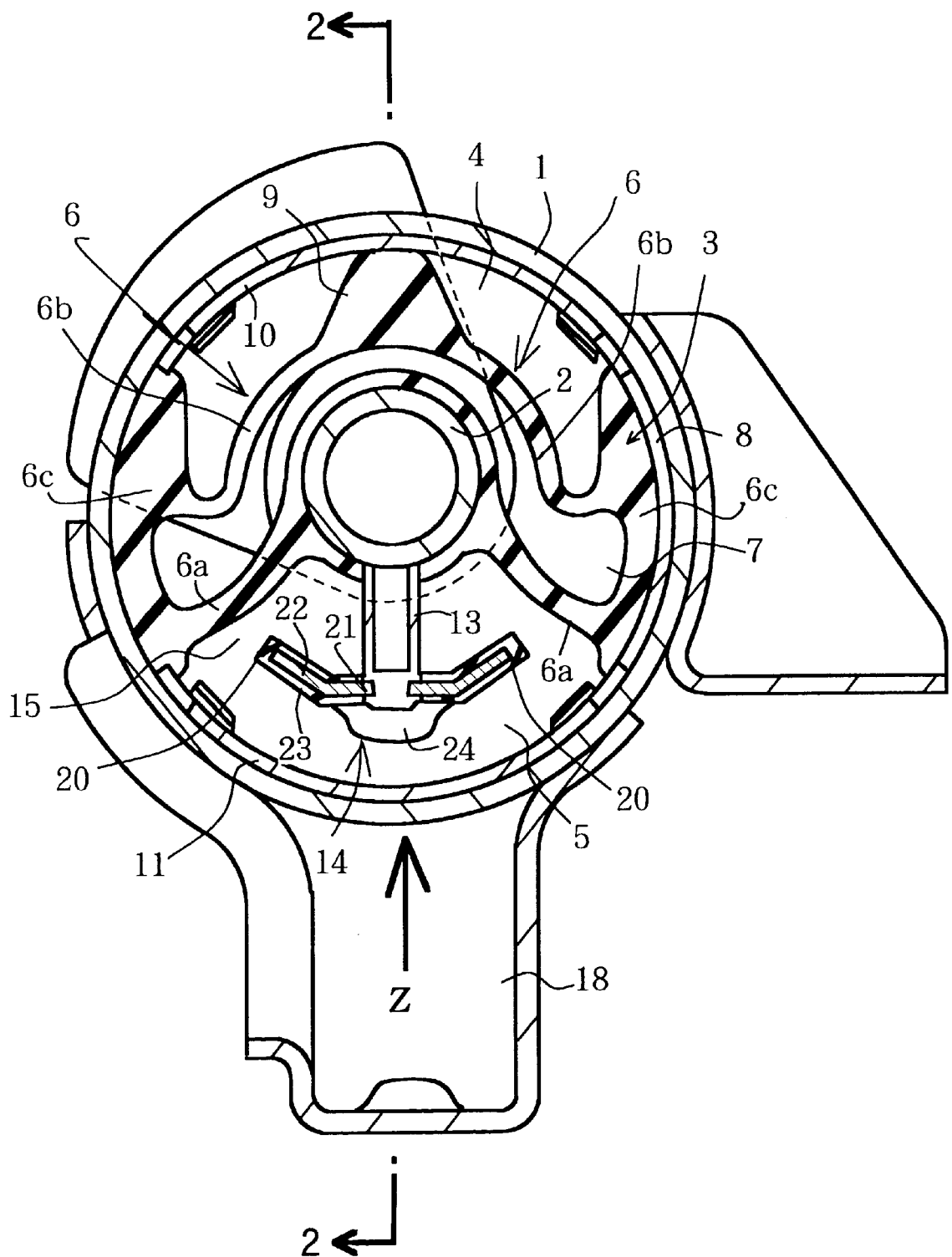
FIG. 1 is a transverse sectional view showing a liquid sealed type bushing according to the first embodiment.
Figure 2:
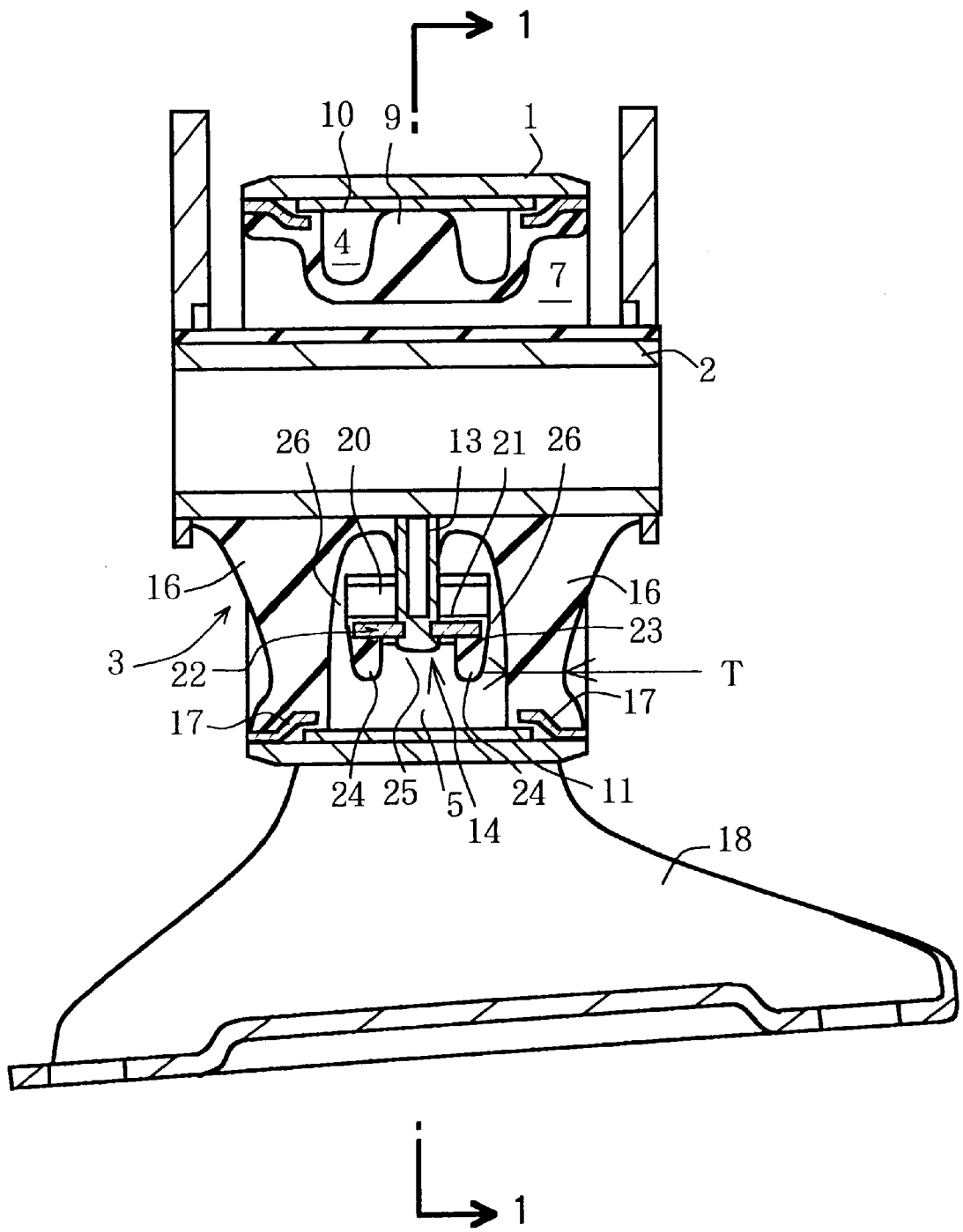
FIG. 2 is a vertical sectional view showing a liquid sealed type bushing according to the present invention.
Figure 3:
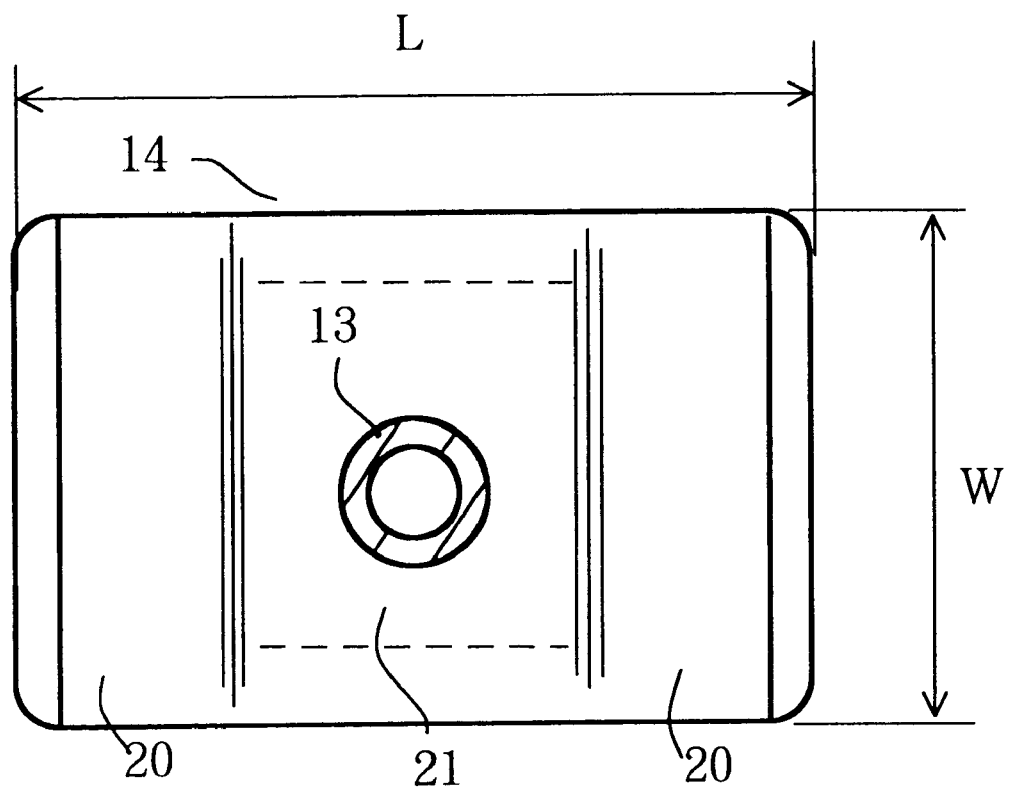
FIG. 3 is a view showing a medium to high frequency device from an axial direction of a mounting shaft.
Figure 4:
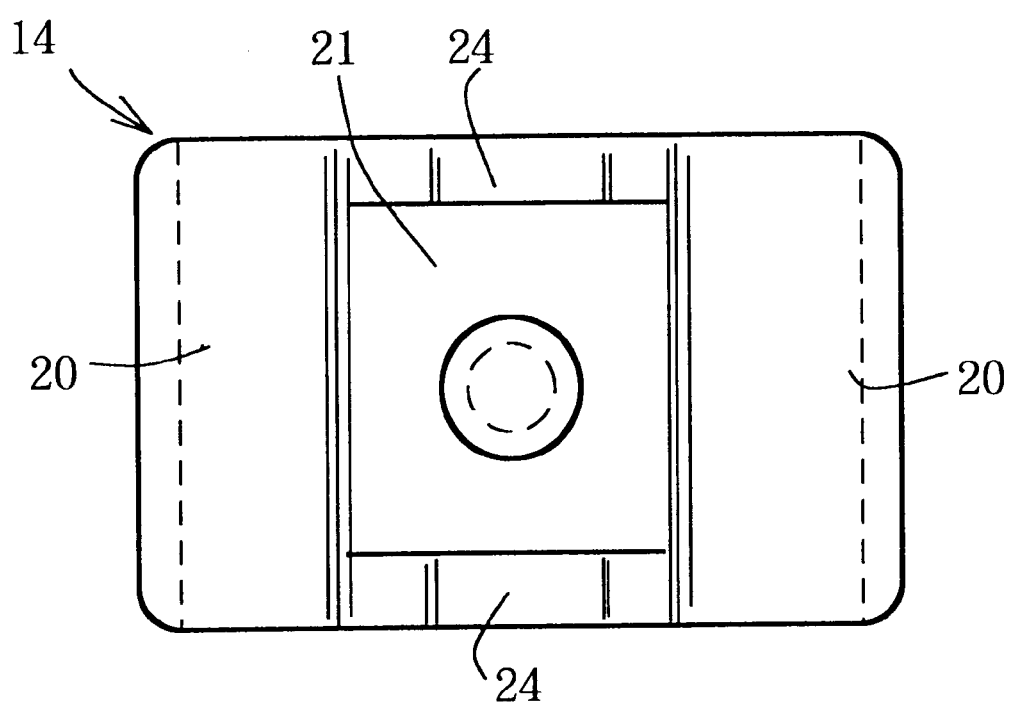
FIG. 4 is a view from the direction of arrow Z of FIG. 1.
Figure 5:
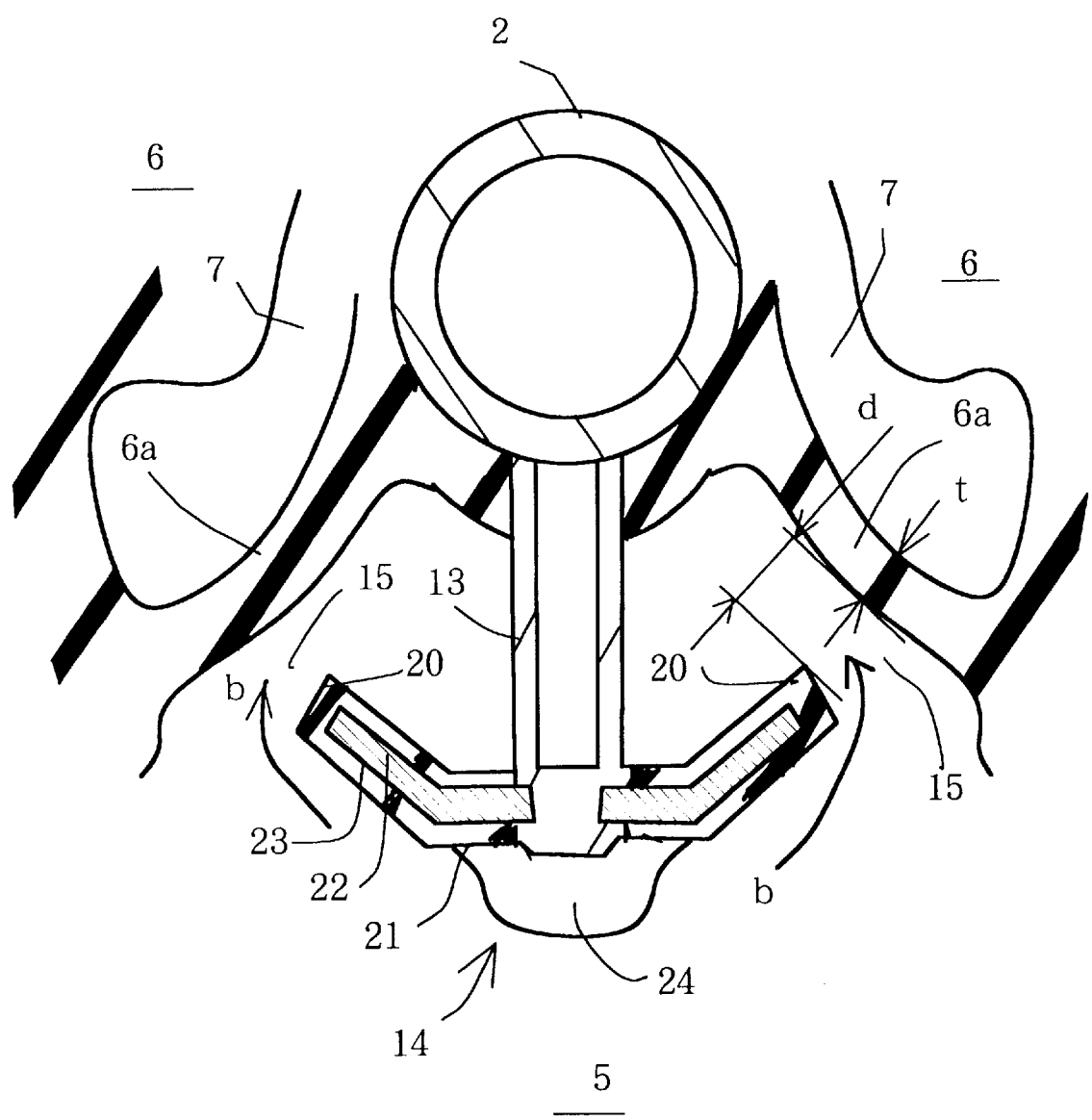
FIG. 5 is an enlarged view showing a medium to high frequency device.
Figure 6:
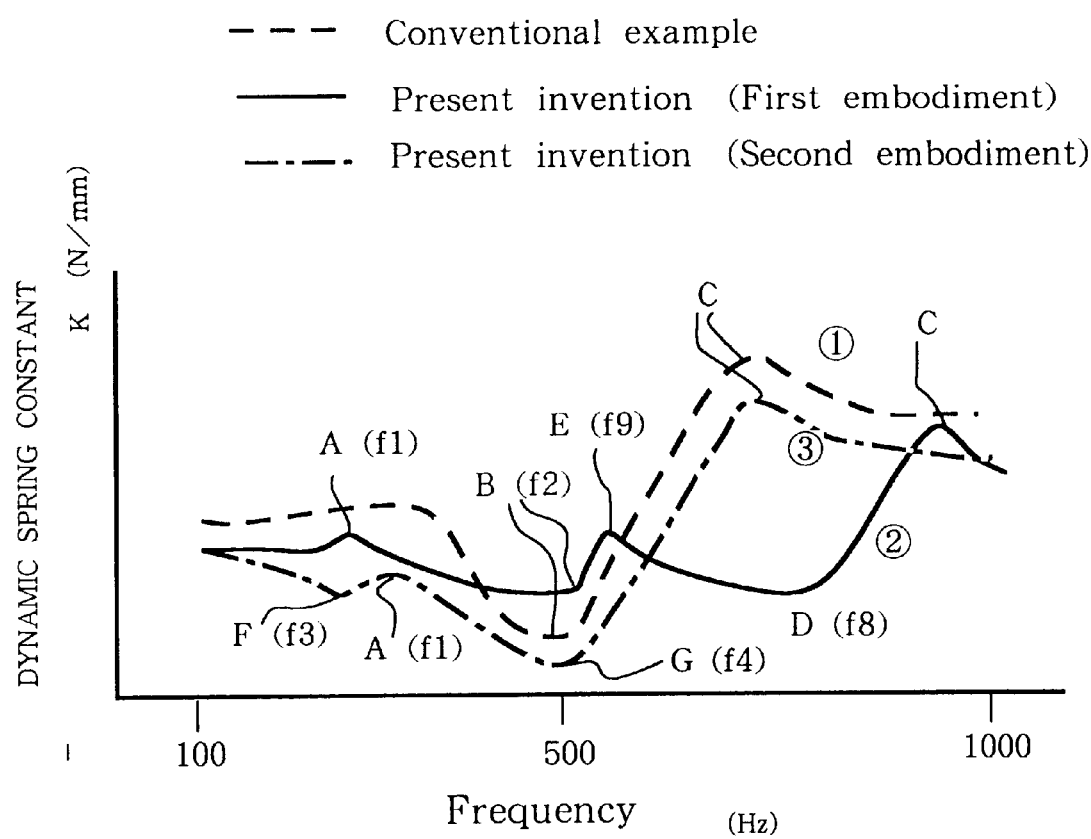
FIG. 6 is a graph showing dynamic spring characteristics of the liquid sealed type bushing.
Figure 8:
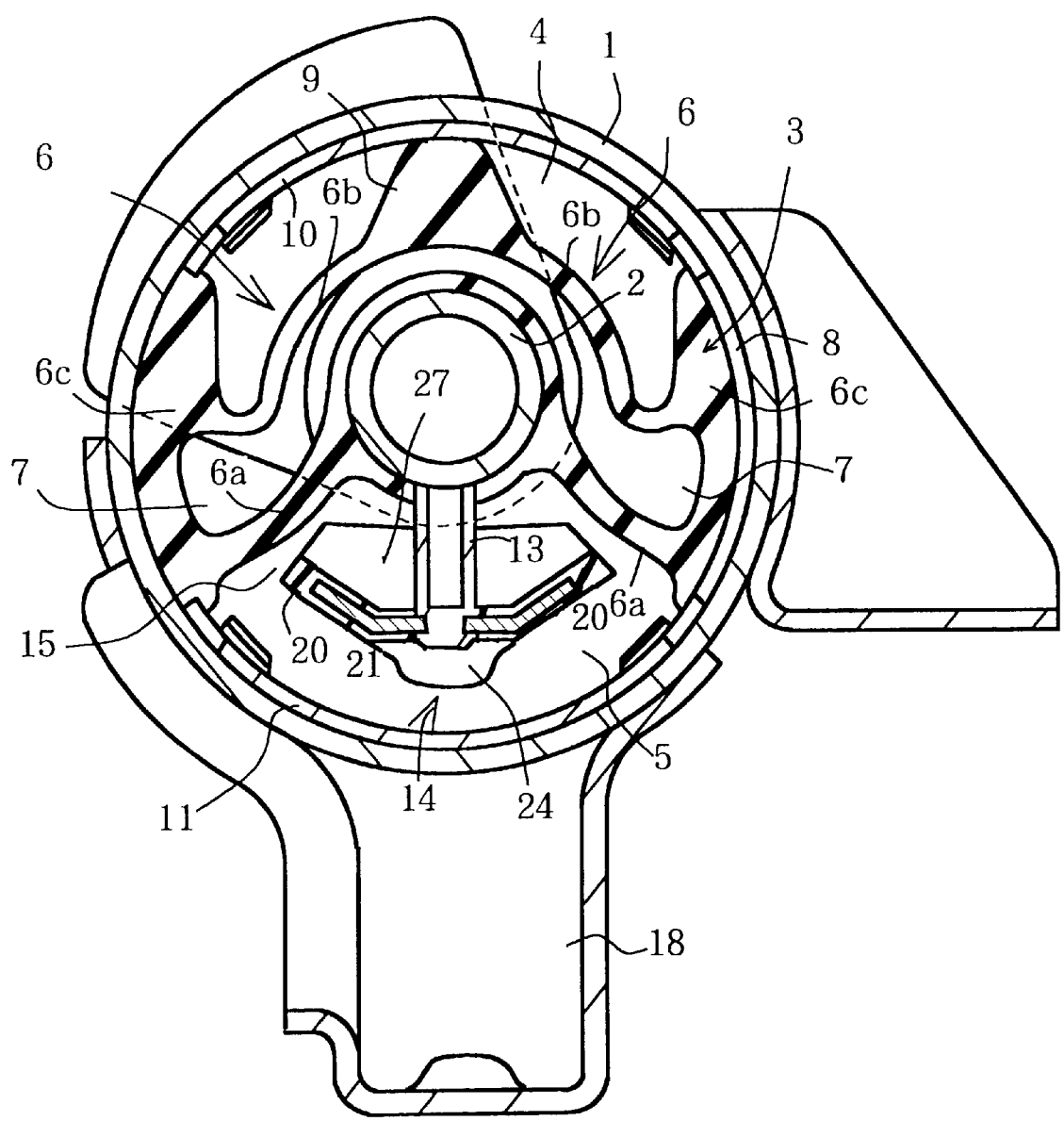
FIG. 8 is a view equivalent to the FIG. 1 according to the second invention.

Referring to FIG. 1 to FIG. 7, a first embodiment of the present invention is described. FIG. 1 is a transverse sectional view showing a liquid sealed type bushing of the present invention (a cross sectional view taken along line 1—1 of FIG. 2), FIG. 2 is a vertical sectional view taken along line 2—2 of FIG. 1, FIG. 3 is a view showing a medium to high frequency device from an inner cylinder side, FIG. 4 is a view from the direction of arrow Z, FIG. 5 is an enlarged view showing the medium to high frequency device portion of FIG. 1, FIG. 6 is a graph showing dynamic spring characteristics according to the liquid sealed type bushing and FIGS. 7A–7C show the formation of the dynamic spring characteristics.

In these FIGS., the liquid sealed type bushing comprises an outer cylinder 1 formed in a cylindrical shape, an inner cylinder 2 as a core member arranged generally concentrically inside thereof, and an elastic member 3 interposed between the outer cylinder 1 and the inner cylinder 2. The elastic member 3 is formed together with the inner cylinder 2 from rubber, elastomer or other suitable elastic materials and, recesses 4 and 5 are formed in a middle portion of a longitudinal direction thereof on both sides of the inner cylinder 2. Parts of the elastic member 3 left between the recess 4 and 5 are adapted to form a partition member 6.

Across the thickness of the partition member 6, a through hole 7 is formed in parallel with an axial direction of the inner cylinder 2 (hereinafter, described merely as axial direction). By making thickness relief as the through hole 7, a thin wall portion 6a of the present invention facing the recess 5, a thin wall portion 6b facing the recess 4 and a base portion 6c abutting against the outer cylinder 1 are respectively formed.

As shown in a transverse section of FIG. 1, the thin wall portion 6a is arranged to be such that a center portion thereof is integrated with a periphery of the inner cylinder 2, both right and left end portions thereof are made to continue to the base portion 6c, and the thin wall portion 6a generates membrane resonance according to vibration input in a medium to high frequency region. The thickness of the thin wall portion 6 is set to have a peak value at a specified frequency f1 (see FIG. 6).

Thickness t of the thin wall portion 6a is less than about ½ of a minimum thickness T (see FIG. 2) of a circular wall 16. However, this thickness t can be optionally set in a range to be smaller than T according to a required frequency f1 and the like.

On a part of a periphery of the partition member 6, an orifice groove 8 is formed. In a center portion within the recess 4, a stopper projection 9 is arranged to project integrally from the inside to the outside. The recesses 4 and 5 are respectively covered with a liquid chamber cover 10 and 11, and each of recesses 4 and 5 are adapted to become the liquid chambers by filling liquid inside thereof.

In the state when the partition member 6 is fitted into the outer cylinder 1, the base portion 6c, which is a peripheral portion of the partition member 6 and arranged on the outer cylinder 1 side, is tightly contacted in a non-combining state to an inner circumference surface of the outer cylinder 1 to a length of about ½ circle to a circumferential direction thereof. The length of the tight contact can be optionally set. Hereupon, the non-combining state means a state different from the conventional baked construction, the outer peripheral portion of the partition member 6 and the inside of the outer cylinder 1 are merely pressure contact and permitted to relatively shift by a large load. In this assembled condition, the recess 4 becomes an auxiliary liquid chamber and the recess 5 becomes a main liquid chamber, and these recesses 4 and 5 communicate with the orifice passage formed by the orifice groove 8 and the inner surface of the outer cylinder 1.

Additionally, in the recess 5 as the main liquid chamber, an umbrella shaped medium to high frequency device is mounted to a tip of a mounting shaft 13 projecting outward in a radial direction from the inner cylinder 2, and an orifice aperture 15 is formed between an outer peripheral portion of the medium to high frequency 14 and the partition member 6.

As is apparent from FIG. 5, by setting optionally a gap d between a tip of a peripheral portion of the medium to high frequency device 14 and a facing portion of the partition member 6, the orifice aperture 15 is set to control a flow b of liquid generated along the medium to high frequency device 14 and to generate a liquid column resonance at a specified frequency f2 (see FIG. 6) in the medium to high frequency region between the orifice aperture 15 and the partition member 6. The minimum value according to the desired specification is thus attained.

As shown in FIGS. 3, 4 and 5, the medium to high frequency device 14 is formed to be generally oblong when viewed from an axial direction of the mounting shaft 13. A long side of the device extends up to a vicinity of the thin wall portion 6a of the right and left partition members 6 in the transverse sectional view of FIG. 1, and each tip portion thereof is adapted to be a slope portion 20 facing almost vertically toward the thin wall portion 6a. To a center portion 21 thereof, a tip end of the mounting shaft 13 is fixed by caulking and the entire body thereof is constructed with a base plate 22 formed in a metal plate shape having a rubber layer covering a circumference thereof.

From the center portion 21, rubber stoppers 24 are formed projecting toward the outer cylinder 1. As shown in FIG. 2, the rubber stoppers 24 are formed integrally with the rubber layer 23 as a pair separating mutually in an axial direction of the inner cylinder 2. A passage 25 is formed between both rubber stoppers 24.

As shown in FIG. 2, the short side of the medium to high frequency device is arranged at a space to the axial direction between a right and left circular walls 16, 16. As shown in FIG. 3, it is assumed that the length of the long side is L and the length (width) of the short side is W. The values L and W are set as rather smaller than that of a second embodiment of the invention.

On both end portions of the elastic member 3 along the axial direction of the inner cylinder 2, the circular walls 16, 16 are provided to cover the end portion of the recesses 4 and 5 in the axial direction, and are fixed by press fitting to the inside of the outer cylinder 1 via rigid rings 17 inserted into each outer peripheral portion. Between also each inner surface of these right and left circular walls 16, 16 and the medium to high frequency device 14, a passage 26 is formed (see FIG. 2).

Numeral 18 indicates a bracket for mounting the bushing to the vehicle body, and the inner cylinder 2 is connected to an engine side.

Next, a function of the embodiment of the present invention is described. Since the thin wall portion 6a is provided on the partition member 6, a spring constant is adapted to be much lower than that of a conventional device, the entire body is made to be a low dynamic spring. When the vibration input of the medium to high frequency region is applied, because the membrane resonance in the thin wall portion 6a of the partition member 6 is mainly generated and the liquid column resonance in the orifice aperture 15 formed between the outer periphery of the medium to high frequency device 14 and the partition member 6 is added thereto, the minimum value B of the dynamic spring characteristic occurs, and the peaks A, C are generated in lower and higher frequencies than that of B.

The peak A is generated under the strong influence of the peak occurring followed to the membrane resonance of the partition member 6, and the frequency in this time is assumed as f1. The minimum value B occurs through superposing the peak (p4 in FIG. 7) of the high frequency region side generated by reaction of the membrane resonance with the minimum value (b4 in FIG. 7) generated by the liquid column resonance of the medium to high frequency device. The peak in the high frequency side is offset by the minimum value generated owing to the liquid column resonance, which is strongly affected by the medium to high frequency device. When this frequency is assumed as f2, the frequencies are related as f1<f2.

Accordingly, because the spring constant of the partition member 6 is decreased, the partition member 6 is adapted to not combine with the outer cylinder 1. At the same time, the liquid column resonance by the medium to high frequency device is superposed thereon and the peak A is brought down. At the same time, when the dynamic spring constant of the minimum value B is made not to be very low, and the minimum value B is adapted to be near as the peak A, the rising reaction in the higher frequency of the minimum value B is restrained and the peak value C generated by the reaction is shifted to the higher frequency side.

This peak C, which is formed through the reaction of the liquid column resonance making the minimum value B by the medium to high frequency device, has a value which is no more than that of the conventional example. The peak A is also lower than the conventional level, and the minimum value B shows also, as aforementioned, a low dynamic spring constant of practically sufficient degree.

The liquid column resonance due to the medium to high frequency device 14 is generated by a flow b flowing into the orifice gap 15 from an opening between the short side portion of the medium to high frequency device 14 and the thin wall portion 6a along the slope portion 20. Since the gap d of the orifice gap 15 is relatively large, the resonance frequency f2 becomes relatively high. Because there is a relatively large space between the long side portion and the circular wall, the flow flowing into the orifice gap 15 (see FIG. 13) does not appreciably contribute to the liquid resonance.

As mentioned above, according to the present embodiment, the lower than conventional dynamic spring constant one can be realized in approximately the entire range of the medium to high frequency. Further, because a small peak E between the minimum value B and D is generated through offsetting the peak p4 of the high frequency side in the membrane resonance by the minimum value b4 generated through the resonance of the medium to high frequency device 14, and the low dynamic spring constant is yielded in the high frequency range side up to 1000 Hz by the minimum value D, lowering the dynamic spring constant is remarkably accomplished especially in the high frequency side.

Figure 13:
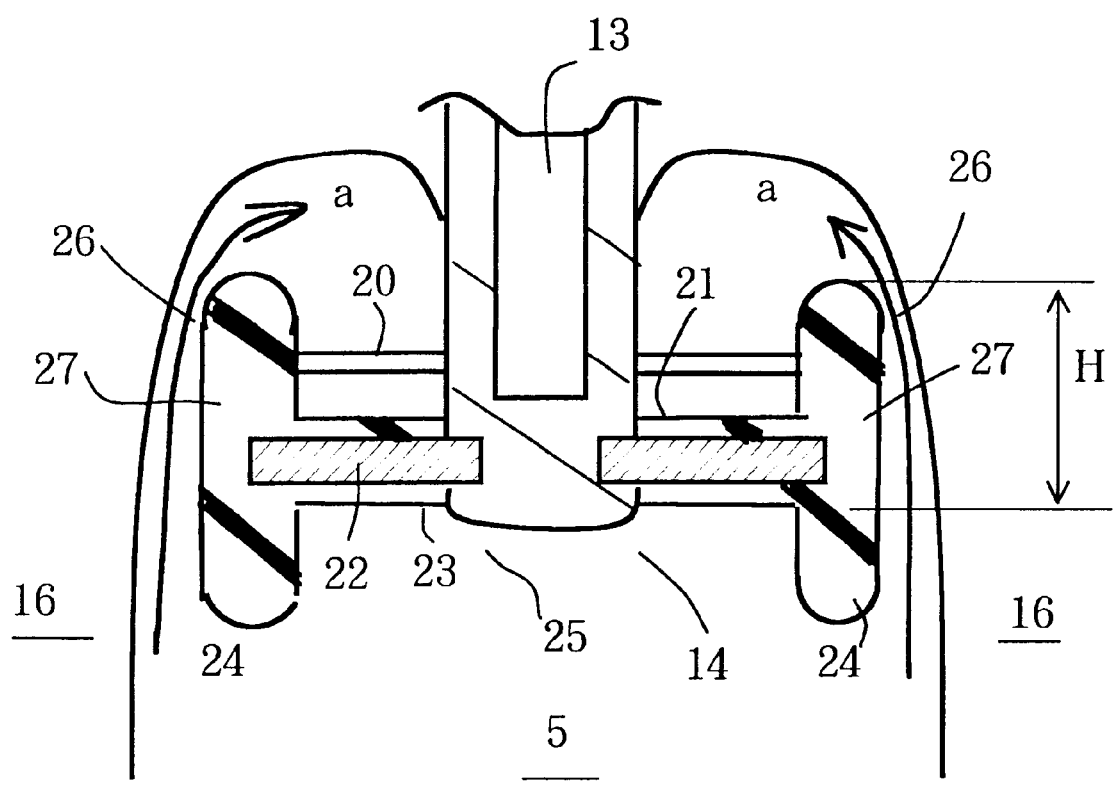
FIG. 13 is an enlarged view showing the medium to high frequency device part from a different direction from FIG. 11.

Next, according to the FIGS. 8 to 13, the second embodiment is described. FIGS. 8 to 12 are views respectively corresponding to FIGS. 1 to 5 of the first embodiment, and FIG. 13 is an enlarged view of the medium to high frequency device of FIG. 12. Since the present embodiment shows a device similar to the first embodiment of the medium to high frequency device, common numerals are used for the common portions and descriptions for the duplicated portions is omitted if possible.

Figure 9:
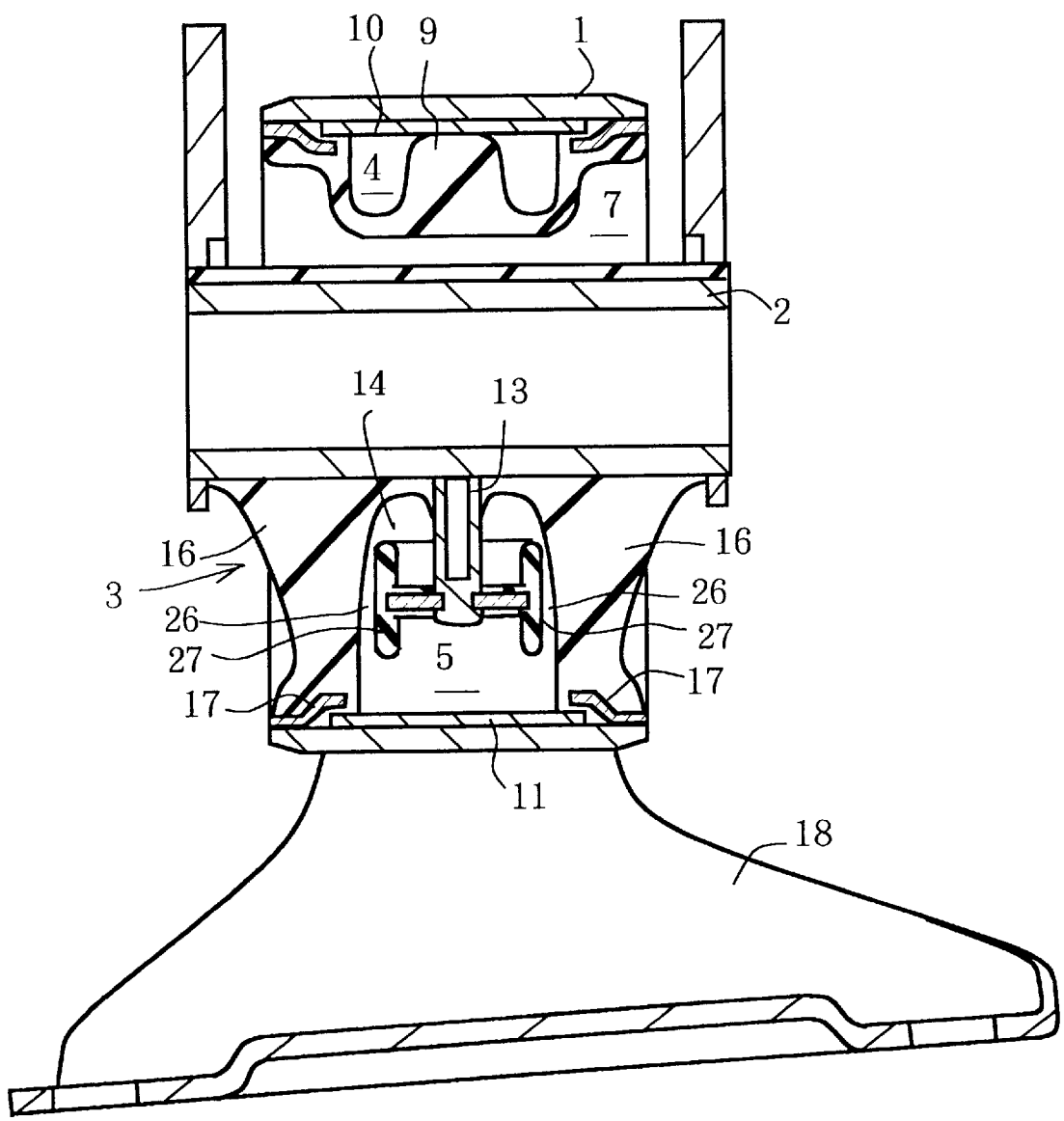
FIG. 9 is a view equivalent to the FIG. 2 according to the second invention.
Figure 10:
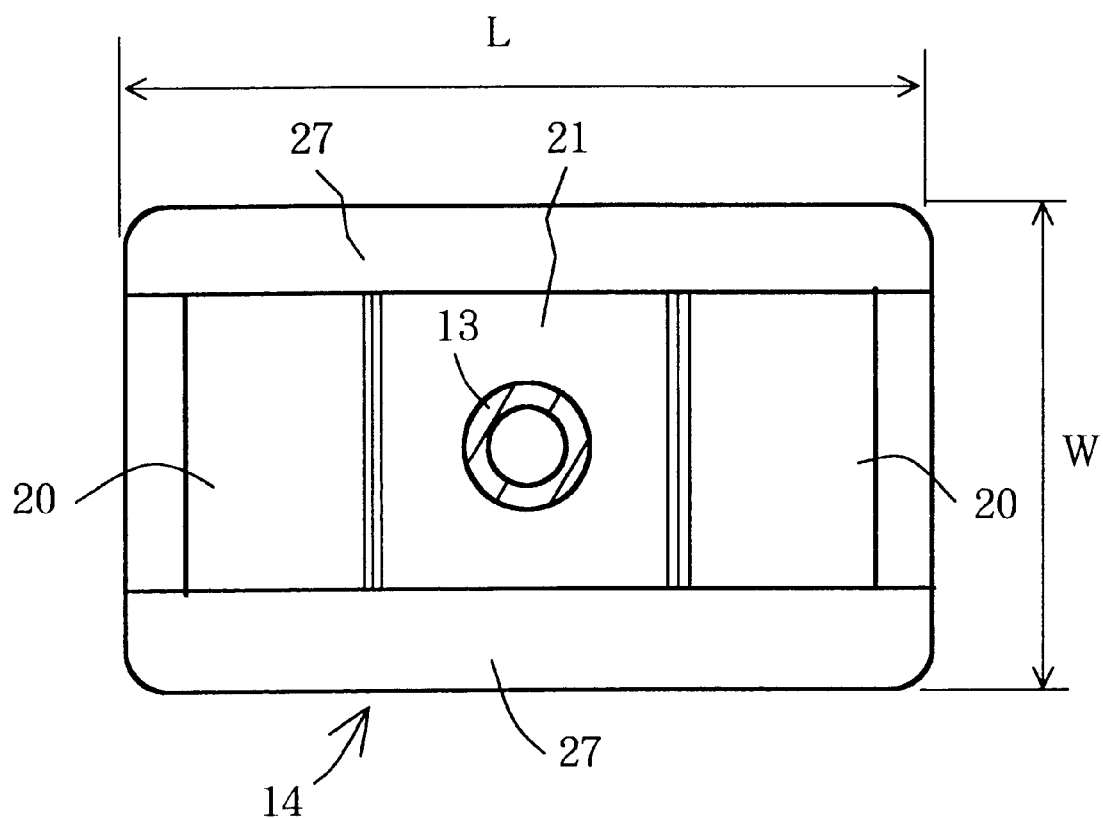
FIG. 10 is a view equivalent to the FIG. 3 according to the second invention.
Figure 11:
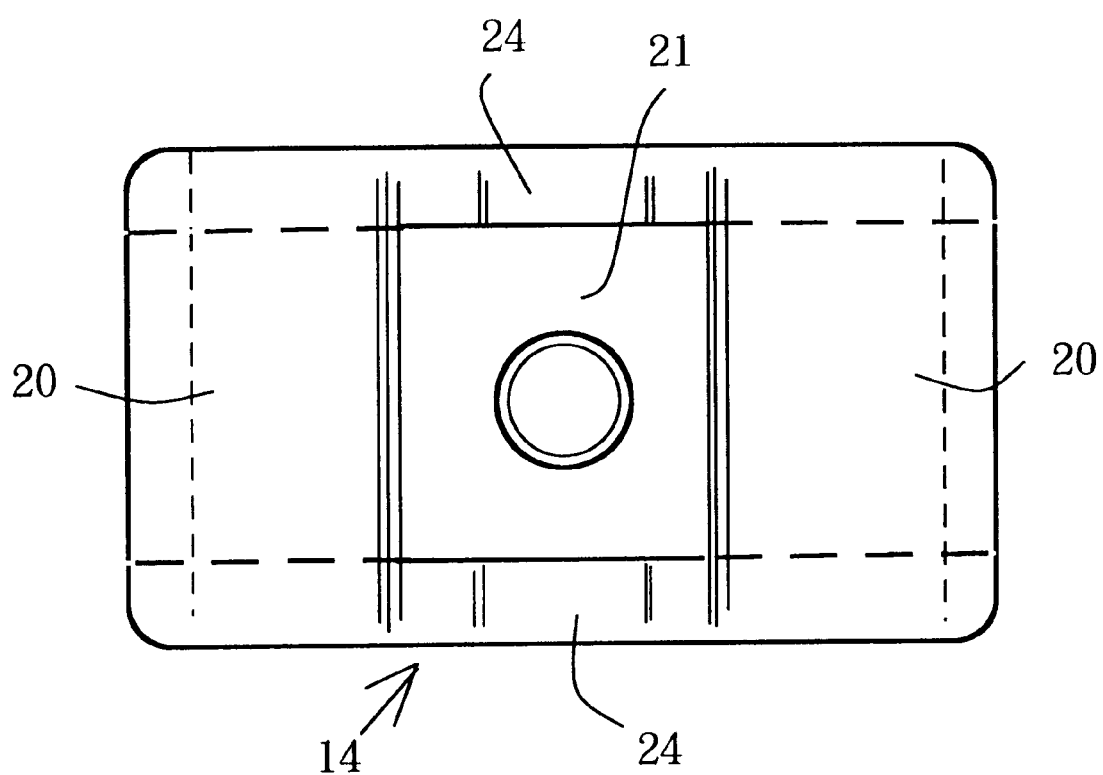
FIG. 11 is a view equivalent to the FIG. 4 according to the second invention.
Figure 12:
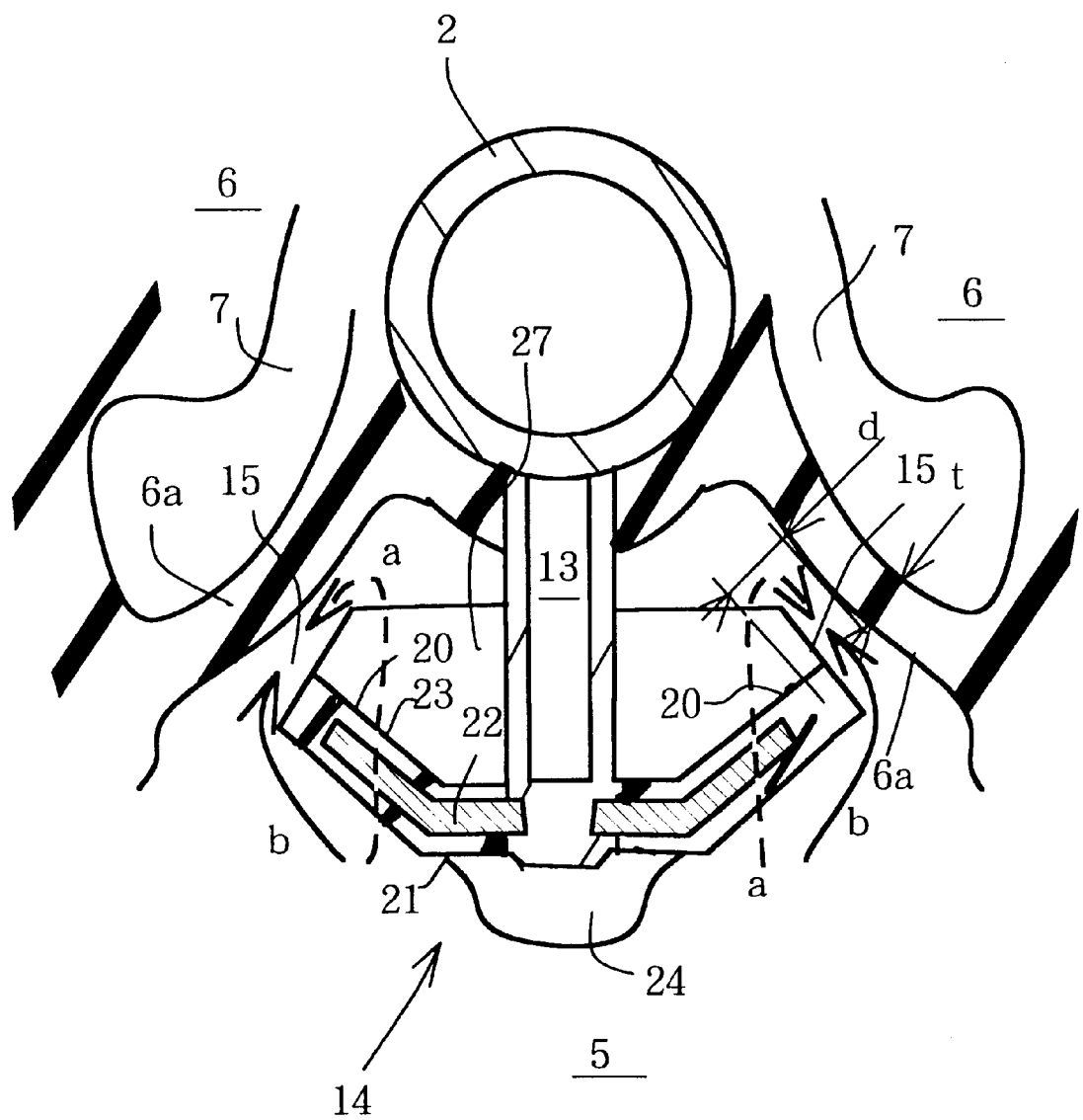
FIG. 12 is a view equivalent to the FIG. 5 according to the second invention.

As apparent from these drawings, in the medium to high frequency device 14, a pair of rubber walls 27 are integrally formed with the rubber layer 23 along both long side portions thereof, and are projected oppositely toward the inner cylinder 2 side in parallel on both sides of the mounting shaft 13. As shown in FIG. 9, the length L of the long portion and the length W of the short side portion are respectively made to be longer than that of the first embodiment. Which results in that the dap d of the orifice aperture 15 is made to be more narrow and the resonance frequency f4 by the liquid flow b is higher than f1, but approximately as low as that of the minimum value B of the membrane resonance in the first embodiment (see FIG. 6).

Moreover, as shown in FIG. 13, owing to forming the height dimension H of the rubber wall 27 to be extremely large, the liquid column resonance is adapted to be generated by the liquid flow a through the passage 26 formed between each inner surface of the right and left circular walls 16, 16, and the rubber wall 27 to the orifice gap 15. The resonance frequency f3 in this time is lower than f1.

The setting of the resonance frequency f3 can be controlled by the height dimension H of the rubber wall 27. The larger the dimension H becomes, the more liquid flow passing through between the rubber wall 27 and the circular wall 16 to the orifice aperture 15 being guided by the rubber wall 27. The resonance point frequency can be reduced, and inversely, the smaller the dimension H becomes, the higher the resonance point frequency. At the extreme, the present embodiment reduces to a state with no rubber wall, as in the first embodiment.

When made as above stated, as shown in FIG. 6, at a little lower and higher frequency of f1, the minimum values D and E according to the resonance points f3 and f4 are formed by the medium to high frequency device. Besides, strictly speaking, each frequency at the minimum value D and E are somewhat different from f3 and f4, but when the frequency at each minimum value are assumed conveniently f3 and f4, the frequency relations are given as f3<f1<f4. Therefore, the peak A is still more reduced by the minimum values D and E in the lower and higher frequency thereof.

Therefore, according to the present embodiment, the lower dynamic spring constant than that of the former embodiment is put into proactive in the medium frequency range. In this case also, the low dynamic spring constant as a whole can be similarly realized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid sealed bushing comprising:
    an outer cylinder formed in a cylinder shape;
    a core member arranged inside thereof; and
    an elastic member interposed between the outer cylinder and the core member, wherein
    a plurality of recesses are formed as liquid chambers on an outer peripheral side of the elastic member, a partition member made by a part of the elastic member is provided between these chambers, the chambers are mutually communicated with an orifice passage and a medium to high frequency device projects into at least one liquid chamber and includes an umbrella shaped member supported on the core member side, a thin wall portion is formed on a part of the partition member to yield a peak value for a dynamic spring characteristic according to a vibration input in a medium to high frequency range by a membrane resonance and an outer peripheral portion of the partition member is made to contact tightly but not combine with the outer cylinder, the thin wall portion faces to the recess into which the medium to high frequency device projects, the elastic member includes a circular wall portion extending from the core member to the outer cylinder, the circular wall portion having a minimum thickness T measured in an axial direction of the bushing, and a thickness t of the thin wall portion, measured in a transverse cross-sectional plane of the bushing, is less than half of the minimum thickness T of the circular wall portion.

2. A liquid sealed bushing comprising:

an outer cylinder having a cylindrical shape;

a core member disposed within the outer cylinder;

an elastic member disposed between the outer cylinder and the core member;

a plurality of recesses formed as liquid chambers on an outer peripheral side of the elastic member, a partition member being formed by a part of said elastic member being provided between the liquid chambers, the chambers mutually communicating with an orifice passage;

a medium to high frequency device projecting into at least one liquid chamber and having an umbrella-shaped member supported on the core member side, wherein a thin wall portion is formed on a part of the partition member to yield a peak value for a dynamic spring characteristic according to a vibration input in a medium to high frequency range by a membrane resonance, an outer peripheral portion of the partition tightly contacts the outer cylinder but is not unitary with the outer cylinder, two peaks of a dynamic spring characteristic are made to occur in a medium frequency region, due to the membrane resonance, and the peak of the high frequency region is offset due to a minimum value generated by the medium to high frequency device.

3. A liquid sealed bushing comprising:

an outer cylinder having a cylindrical shape;

a core member disposed within the outer cylinder;

an elastic member disposed between the outer cylinder and the core member;

a plurality of recesses formed as liquid chambers on an outer peripheral side of the elastic member, a partition member being formed by a part of said elastic member being provided between the liquid chambers, the chambers mutually communicating with an orifice passage;

a medium to high frequency device projecting into at least one liquid chamber and having an umbrella-shaped member supported on the core member side, wherein a thin wall portion is formed on a part of the partition member to yield a peak value for a dynamic spring characteristic according to a vibration input in a medium to high frequency range by a membrane resonance, an outer peripheral portion of the partition tightly contacts the outer cylinder but is not unitary with the outer cylinder, the medium to high frequency device is adapted to yield a minimum value of dynamic spring characteristic at two resonance frequencies f3 and f4, and these frequencies and a frequency f1 at a peak of the dynamic spring characteristic by the membrane resonance have the following relation:

f3<f1<f4.

4. A liquid sealed bushing comprising:

an outer cylinder;

a core member disposed within the outer cylinder;

an elastic member disposed between the outer cylinder and the core member;

a plurality of recesses formed on an outer peripheral side of the elastic member, liquid chambers being formed by the recesses in the elastic member, a partition member being formed by a part of said elastic member and being provided between the liquid chambers and the outer cylinder;

a frequency device projecting into at least one liquid chamber, the frequency device including, a mounting shaft extending from the core member, the elastic member engaging an exterior surface of the core member, a center portion disposed at a distal end of the mounting shaft, and a pair of sloped portions, each sloped portion extending away from the center portion at an angle to the center portion; and a thin wall portion formed on a part of the partition member to yield a peak value for a dynamic spring characteristic in response to a vibration input, wherein the thin wall portion faces to the liquid chamber into which the frequency device projects, the elastic member includes a circular wall portion extending from the core member to the outer cylinder, the circular wall portion having a minimum thickness T measured in an axial direction of the bushing, and a thickness t of the thin wall portion, measured in a transverse cross-sectional plane of the bushing, is less than half of the minimum thickness T of the circular wall portion.

5. The liquid sealed bushing of claim 4, wherein the sloped portions have two opposed essentially planar sides.

6. The liquid sealed bushing of claim 5, wherein each sloped portion includes an outer rubber layer.

7. The liquid sealed bushing of claim 4, wherein the frequency device includes a rubber stopper portion disposed on an end of the frequency device distal to the core member.

8. The liquid sealed bushing of claim 5, wherein each sloped portion extends from the center portion at an obtuse angle to the center portion.

9. The liquid sealed bushing of claim 4, wherein an outer peripheral portion of the partition member tightly contacts the outer cylinder but is not unitary with the outer cylinder.

10. The liquid sealed bushing of claim 4, wherein the liquid chambers mutually communicate with an orifice passage.

11. The liquid sealed bushing of claim 4, wherein the frequency device further includes at least one elastic wall disposed at least partly between the mounting shaft and one of said sloped portions.

12. The liquid sealed bushing according to claim 7, wherein said at least one elastic wall includes two elastic walls, each wall being at least partly disposed between the mounting shaft and a respective one of said sloped portions.

13. The liquid sealed bushing according to claim 7, wherein the elastic wall is made from rubber.

14. The liquid sealed bushing according to claim 4, wherein an outer peripheral portion of the partition member may contact but is not bonded with an inner face of the outer cylinder.

15. The liquid sealed bushing comprising:
an outer cylinder;
a core member disposed within the outer cylinder;
an elastic member disposed between the outer cylinder and the core member;
a plurality of recesses formed on an outer peripheral side of the elastic member, liquid chambers being formed by the recesses in the elastic member, a partition member being formed by a part of said elastic member and being provided between the liquid chambers and the outer cylinder;
a frequency device projecting into at least one liquid chamber, the frequency device including,
a mounting shaft extending from the core member, the elastic member engaging an exterior surface of the core member,
a center portion disposed at a distal end of the mounting shaft, and
a pair of sloped portions, each sloped portion extending away from the center portion at an angle to the center portion; and
a thin wall portion formed on a part of the partition member to yield a peak value for a dynamic spring characteristic in response to a vibration input, wherein:
two peaks of the dynamic spring characteristic are made to occur in a medium frequency region, due to the membrane resonance; and
the peak of the high frequency region is offset due to a minimum value generated by the frequency device.

16. A liquid sealed bushing comprising:
an outer cylinder;
a core member disposed within the outer cylinder;
an elastic member disposed between the outer cylinder and the core member;
a plurality of recesses formed on an outer peripheral side of the elastic member, liquid chambers formed by the recesses in the elastic member, a partition member being formed by a part of said elastic member and being provided between the liquid chambers and the outer cylinder;

a frequency device projecting into at least one liquid chamber, the frequency device including,
a mounting shaft extending from the core member, the elastic member engaging an exterior surface of the core member,
a center portion disposed at a distal end of the mounting shaft, and
a pair of sloped portions, each sloped portion extending away from the center portion at an angle to the center portion; and
a thin wall portion formed on a part of the partition member to yield a peak value for a dynamic spring characteristic in response to a vibration input, wherein:
the frequency device is adapted to yield a minimum value of the dynamic spring characteristic at two resonance frequencies f3 and f4, and
these frequencies and a frequency f1 at a peak of the dynamic spring characteristic by the membrane resonance have the following relation:
f3<f1<f4.

17. A liquid sealed bushing comprising:
an outer cylinder formed in a cylinder shape;
a core member arranged inside thereof; and
an elastic member interposed between the outer cylinder and the core member, wherein
a plurality of recesses are formed as liquid chambers on an outer peripheral side of the elastic member, a partition member made by a part of the elastic member is provided between these chambers, the chambers are mutually communicated with an orifice passage and a medium to high frequency device projects into at least one liquid chamber and includes an umbrella shaped member supported on the core member side,
a thin wall portion is formed on a part of the partition member to yield a peak value for a dynamic spring characteristic according to a vibration input in a medium to high frequency range by a membrane resonance and an outer peripheral portion of the partition member is made to contact tightly but not combine with the outer cylinder,
the thin wall portion faces to the liquid chamber into which the medium to high frequency device projects, and
a base portion of the partition member connects said thin wall portion to a second thin wall portion of the partition member, a section of the base portion extending between the thin wall portion and the second thin wall portion having a thickness greater than a thickness t of the thin wall portion, the thickness of the section of the base portion being measured in a radial direction outward from the core member.

* * * * *